US005443242A

United States Patent [19]

Gammill et al.

[11] Patent Number: 5,443,242

[45] Date of Patent: Aug. 22, 1995

[54] CONFORMED VALVE SPRING WEAR PLATE

[75] Inventors: Jerry D. Gammill; Randy Frank, both of Leland, Miss.

[73] Assignee: Gammill Parts, Inc., Leland, Miss.

[21] Appl. No.: 315,434

[22] Filed: Sep. 30, 1994

[51] Int. Cl.[6] ............ F16K 31/00

[52] U.S. Cl. ............ 251/337; 123/188.12

[58] Field of Search ............ 251/337; 123/188.11, 123/188.12, 188.13

[56] References Cited

U.S. PATENT DOCUMENTS

| | | | |
|---|---|---|---|
| 1,193,738 | 8/1916 | Thoms | 251/337 |
| 2,516,795 | 7/1950 | Norton | 251/337 |
| 4,590,900 | 5/1986 | Hayashi | 123/188.13 |
| 4,749,167 | 6/1988 | Gottschall | 251/337 |

FOREIGN PATENT DOCUMENTS

| | | | |
|---|---|---|---|
| 882050 | 11/1961 | United Kingdom | 123/188.13 |

*Primary Examiner*—A. Michael Chambers
*Attorney, Agent, or Firm*—Kajane McManus

[57] ABSTRACT

The valve spring wear plate is proposed for use in a locomotive engine cylinder head to protect the areas of the cylinder head each acting as a valve spring seat from becoming grooved by the action of the spring thereagainst. The wear plate accommodates one spring seat at each end thereof, the two end portions being connected together by a narrow bridge portion, the bridge portion keeping the ends from rotational movement caused by action of the spring thereagainst.

7 Claims, 2 Drawing Sheets

CONFORMED VALVE SPRING WEAR PLATE

BACKGROUND OF THE INVENTION

FIELD OF THE INVENTION

The present invention relates to a spring wear plate which is conformed to fit a particular valve arrangement on an engine cylinder head. More specifically, the conformed valve spring wear plate is proposed for use in a diesel locomotive cylinder head, each wear plate being designed to accommodate a pair of springs and comprising a duality of spring seats bridged to one another, the bridge keeping the spring seats themselves from wearing a groove into the cylinder head under action of the springs thereagainst.

Prior Art

Heretofore, various embodiments of valve spring seats have been proposed for use in an internal combustion engine. Such spring seats typically have a circular, washer like configuration, the seat being of a diameter at least equal to that of the spring to be seated thereon, and the washer having a center opening therein through which a valve guide may be received.

Such washer-like spring seat has a tendency to move or rotate as spring actuation thereagainst causes such motion. The motion eventually causes the spring seat itself to cause wear in the cylinder head which it is attempting to cushion.

As will be described in greater detail hereinafter, the valve spring wear plate of the present invention comprises a duality of spring seats engaged to one another by a bridge, the bridge keeping the spring seats from moving and the wear plate taking all the wear created thereagainst by the springs seated thereon.

SUMMARY OF THE INVENTION

According to the invention there is provided a conformed valve spring wear plate for use in protecting a cylinder head of an engine from wear caused by the valve springs seating thereagainst, the wear plate comprising a flat, planar element having two mirror image circular ends connected together by a narrow bridge, each circular end having a circular opening therein, with the narrow bridge being conformed to avoid interference with other structures of the cylinder head.

DESCRIPTION OF THE PREFERRED EMBODIMENT

Figure 1:
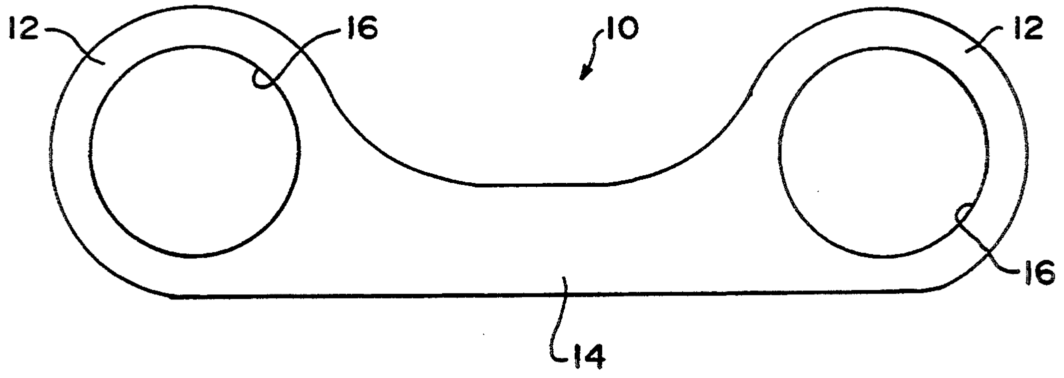
FIG. 1 is a top plan view of the valve spring wear plate made in accordance with the teachings of the present invention.
Figure 2:
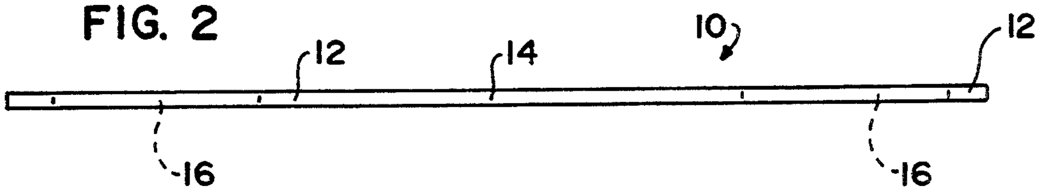
FIG. 2 is a side view of the wear plate of FIG. 1.

Referring now to the drawings in greater detail, there is illustrated therein the valve spring wear plate made in accordance with the teachings of the present invention and generally identified by the reference numeral 10.

As shown, the wear plate 10 is an elongate, thin planar element 10 which includes two mirror image ends 12 connected by a bridge 14. Each end 12 is generally circular in configuration and each includes a center opening 16 therein. The center opening 16 is provided so that a valve guide 18 extending into a spring end engaging pocket 20 in a cylinder head 22 does not preclude positioning of the wear plate 10 over and along a bottom surface 24 of the pocket 20.

In this respect, the wear plate 10 is conformed to fit a particular cylinder head 22, as required, with the distance between the center openings 16 being determined by the particular valve arrangement in the particular cylinder head 22.

Further, the bridge 14 must also be conformed to each particular application.

In this respect, as the bridge 14 overlies a portion of the center pocket 20 in the cylinder head upper surface, it must conform to allow various other structures on the surface to extend therepast. For example, an injector stud 24 may seat on the surface in an area between the two valve guides 18 to be engaged by the wear plate 10. Accordingly, in the shown embodiment of the wear plate 10, the bridge 14 has been narrowed relative to the circular ends 12 so that the injector stud 24 does not interfere with proper placement of the wear plate 10, i.e., the placement of the wear plate 10 along the bottom surface of the pocket 20, as described above.

Figure 3:
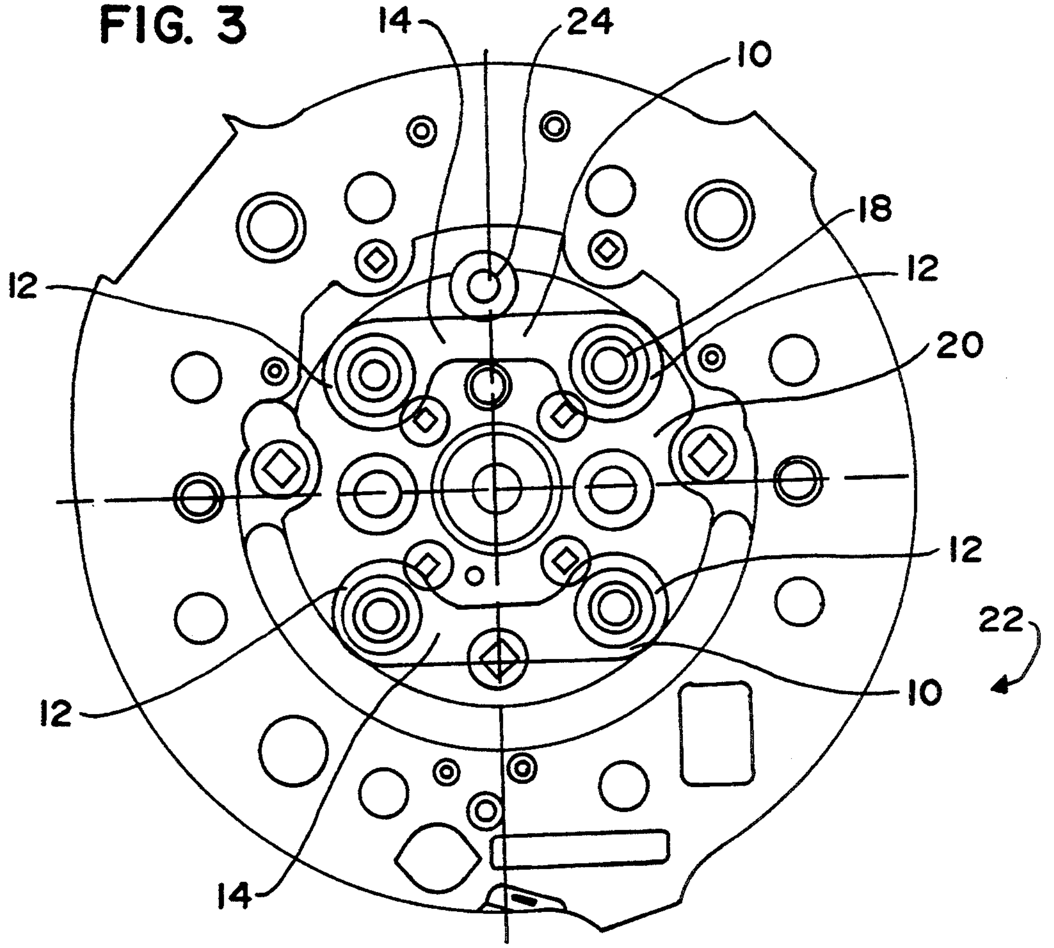
FIG. 3 is a top plan view of a cylinder head showing two wear plates in position thereon.
Figure 4:
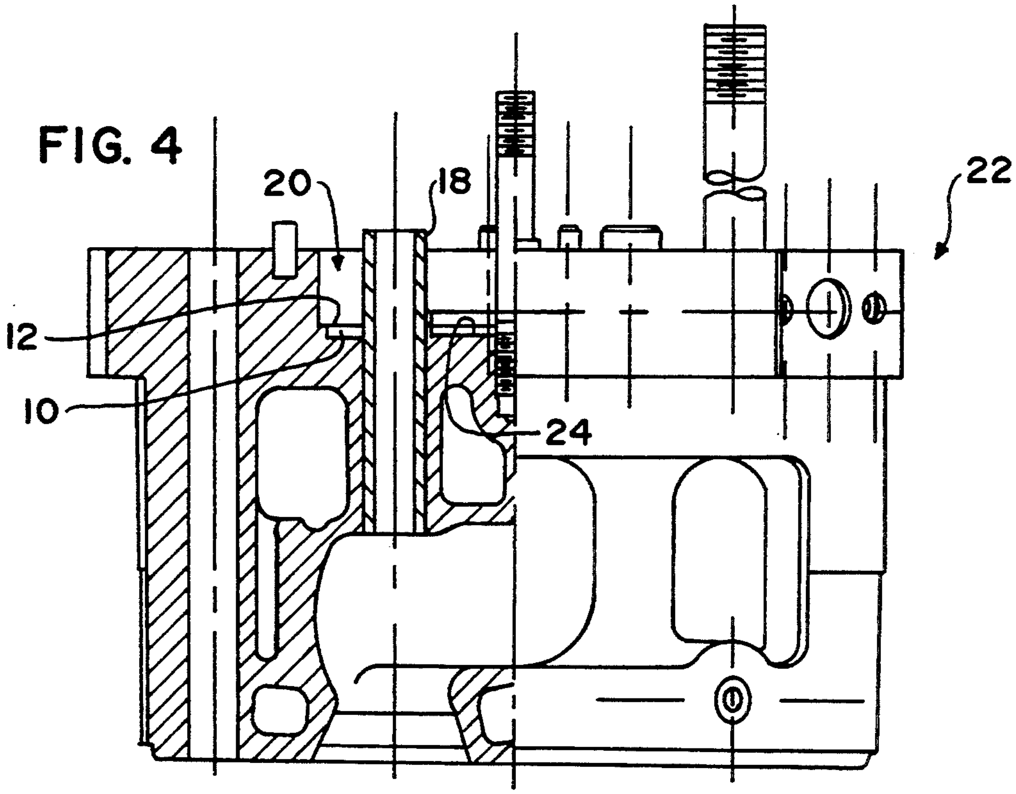
FIG. 4 is a side view, partially in cross section, of a cylinder head showing a portion of one wear plate seated about a valve guide extending into a pocket within which the spring is to engage.

It will be seen from FIG. 3 that the conformity of the bridge 14 to avoid potentially interfering structures is necessary because of required placement of the wear plate 10.

In this respect, the wear plate 10 must seat against the lower surface 24 of the pocket 20 formed in the top surface of the cylinder head 22. The wear plate 10 bridge 14 keeps the ends 12 of the wear plate 10 from being able to move or rotate, ensuring maintained integrity of the cylinder head 22 area beneath the plate 10.

Thus, all wear is assimilated by the wear plate 10, significantly increasing longevity of the cylinder head 22.

Further, by simplicity of the fixed in position design of the openings 16 in the ends 12, the wear plate 10 becomes a drop in item during repairs of the cylinder head 22, rather than requiring an exact positioning of each spring seat for proper engagement of the spring end thereover.

As described above, the wear plate 10 of the present invention has a number of advantages, some of which have been described above and others of which are inherent in the invention. Also, modifications can be proposed to the wear plate without departing from the teachings herein. Accordingly the scope of the invention is only to be limited as necessitated by the accompanying claims.

We claim:

1. A conformed valve spring wear plate for use in protecting a cylinder head of an engine from wear caused by the valve springs seating thereagainst, the wear plate comprising a flat, planar element having two mirror image circular ends connected together by a narrow bridge, each circular end having a circular opening therein, with the narrow bridge being conformed to avoid interference with other structures of the cylinder head.

2. The wear plate of claim 1 wherein the openings are centered in the circular ends.

3. The wear plate of claim 2 wherein each openings is sized and configured to engage over a valve guide on the cylinder head.

4. The wear plate of claim 3 wherein each valve guide is centered within a valve spring seat of the cylinder head.

5. The wear plate of claim 4 wherein each circular end thereof is conformed to seat within, and engage against a bottom surface of, a valve spring seat.

6. The wear plate of claim 5 wherein two valve spring seats are accommodated by one wear plate.

7. The wear plate of claim 6 wherein one cylinder head requires two such wear plates.

* * * * *